(12) United States Patent
Hirai

(10) Patent No.: US 6,839,503 B1
(45) Date of Patent: Jan. 4, 2005

(54) TRANSFER APPARATUS AND RECORDING CONTROL SYSTEM USING A TRANSFER CONTROL METHOD SELECTED BASED ON A TRANSFER RATE OF DATA

(75) Inventor: Jun Hirai, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/472,365

(22) Filed: Dec. 23, 1999

(30) Foreign Application Priority Data

Dec. 28, 1998 (JP) .......................... P10-372675

(51) Int. Cl.⁷ .................. H04N 5/76; H04N 7/167; H04N 7/16; H04H 9/00; G11B 15/04
(52) U.S. Cl. ..................... 386/94; 360/60; 380/201; 725/1; 455/2.01
(58) Field of Search .................. 386/6–8, 33, 45, 386/68, 69, 70, 94, 81–82, 111–112, 125–126; 455/2.01; 725/1–21; 360/60; 380/201, 203; 713/182, 93; 705/51, 52, 57; H04N 5/76, 9/79, 5/781, 5/783

(56) References Cited

U.S. PATENT DOCUMENTS

| | | | |
|---|---|---|---|
| 5,572,517 A | * 11/1996 | Safadi | .................. 370/431 |
| 5,848,154 A | 12/1998 | Nishio et al. | .................. 380/4 |
| 6,038,367 A | * 3/2000 | Abecassis | .................. 386/46 |
| 6,055,571 A | * 4/2000 | Fulp et al. | .................. 709/224 |
| 6,226,618 B1 | * 5/2001 | Downs et al. | .................. 705/1 |
| 6,418,558 B1 | * 7/2002 | Roberts et al. | ............. 725/129 |
| 2002/0194130 A1 | * 12/2002 | Maegawa et al. | ............. 705/51 |

FOREIGN PATENT DOCUMENTS

| | | |
|---|---|---|
| EP | 0862318 | 9/1998 |
| EP | 0944080 | 9/1999 |
| EP | 0977200 | 2/2000 |

* cited by examiner

*Primary Examiner*—Thai Tran
(74) *Attorney, Agent, or Firm*—Jay H. Maioli

(57) ABSTRACT

A transfer apparatus for transferring data which achieves balancing in profit and loss between a proprietor of copyright and a user includes an instruction section for providing an instruction of a transfer rate, a transfer control section for variably using one of various transfer control methods for data in response to the transfer rate of the instruction provided by the instruction section, and a billing control section for changing the transfer control method by the transfer control section in response to billing processing performed by a user of the transfer apparatus.

17 Claims, 5 Drawing Sheets

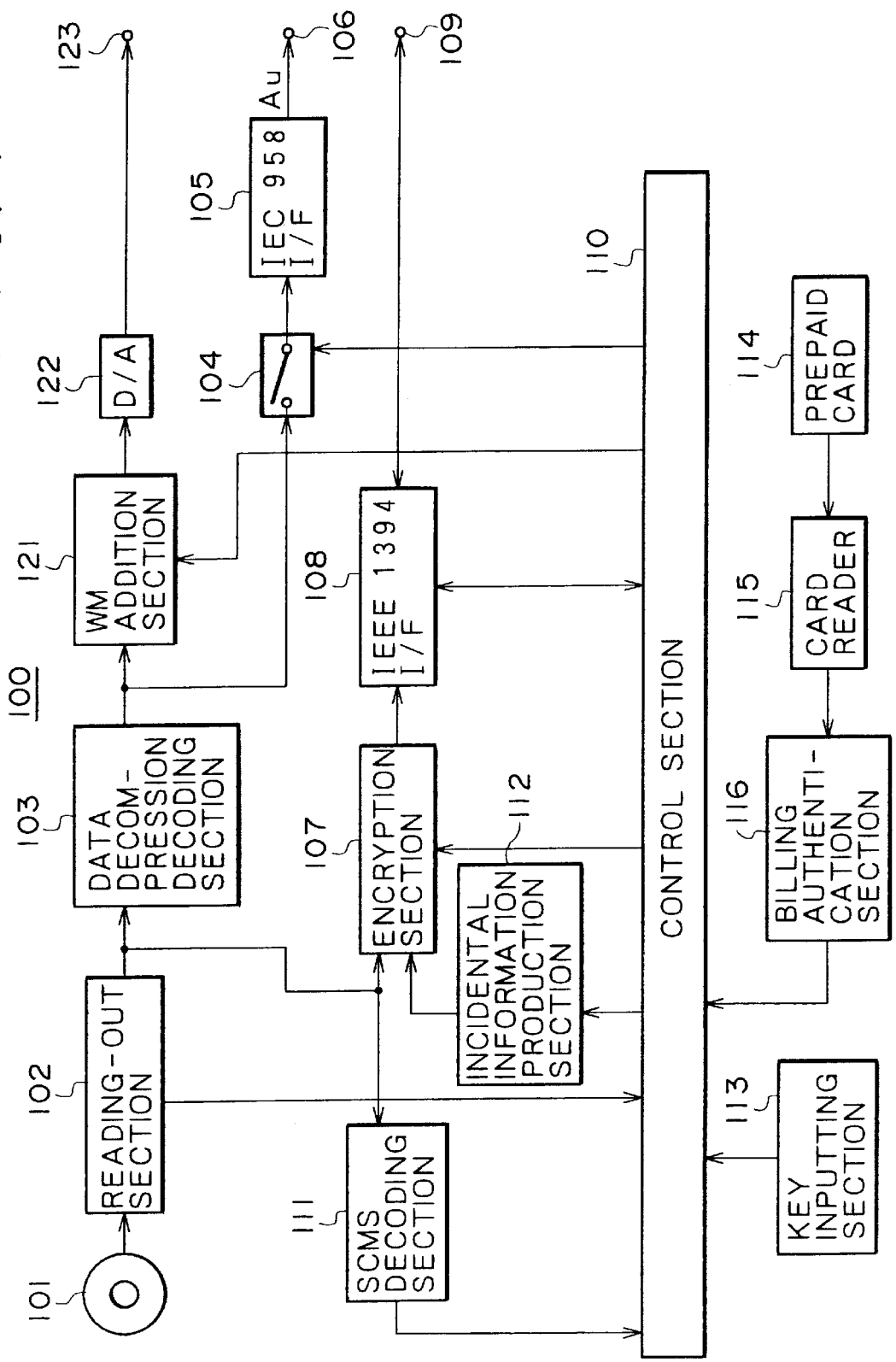

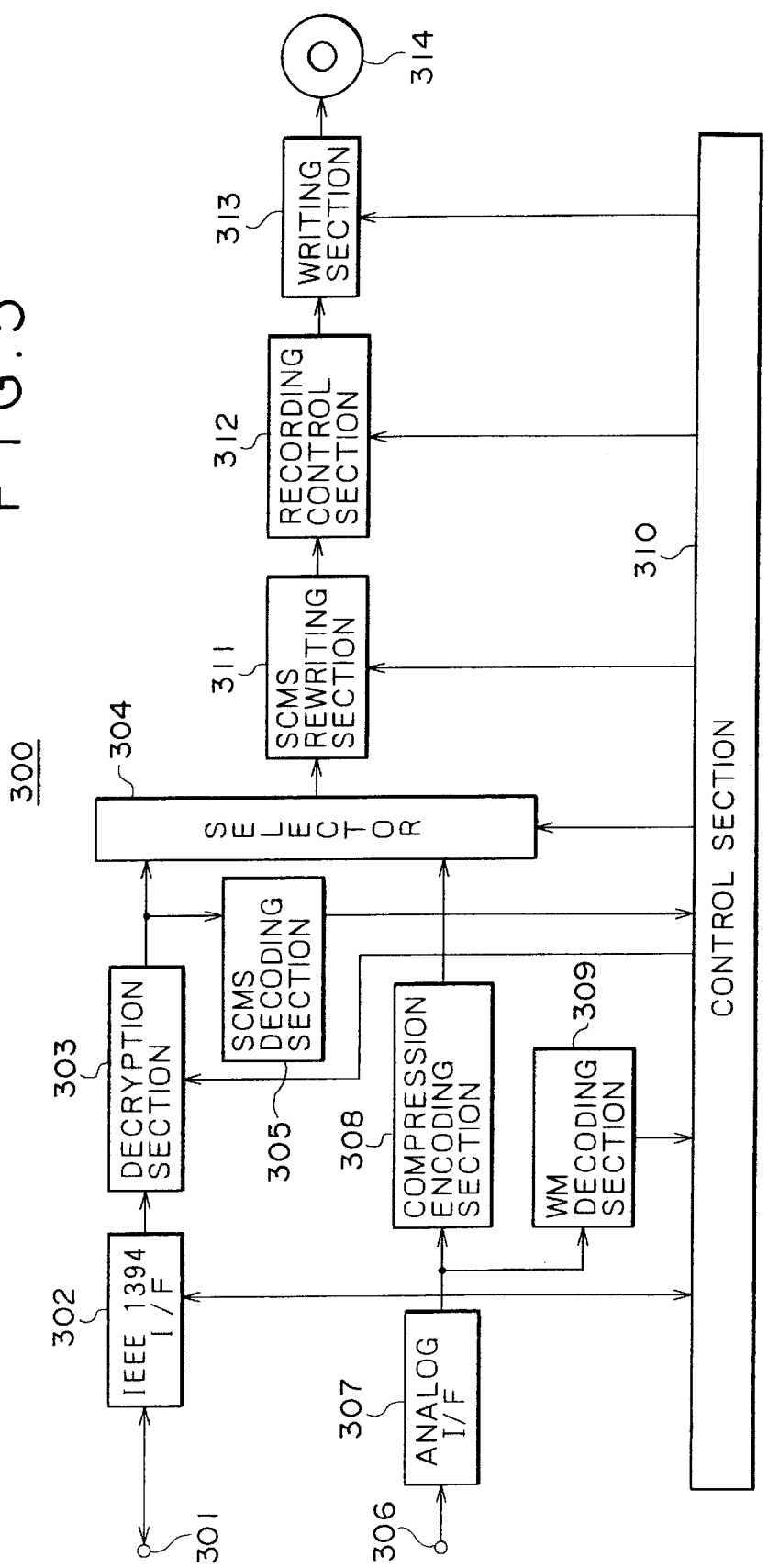

TRANSFER APPARATUS AND RECORDING CONTROL SYSTEM USING A TRANSFER CONTROL METHOD SELECTED BASED ON A TRANSFER RATE OF DATA

BACKGROUND OF THE INVENTION

1. Field of the Invention

This invention relates to a transfer apparatus, a recording control apparatus, a transfer method and a recording control method for an information signal such as, for example, an audio signal or a video signal.

2. Description of the Related Art

As digital contents are popularized, infringement upon copyright by illegal copying of digital contents becomes an issue. In particular, since analog recording onto a tape medium or a like medium records audio data or video data in an analog fashion, copying of data deteriorates the quality of the data. In contrast, apparatus which record and reproduce audio data or video data in a digital fashion do not give rise to a problem of deterioration of the information quality by copying in principle and allows a large number of times of copying of information to be performed without any deterioration of the information quality.

Consequently, the damage by illegal copying by means of an apparatus which processes information digitally is much greater than that by means of an apparatus which processes information in an analog fashion. Therefore, it is very significant to prevent illegal copying by an apparatus which processes data in a digital fashion.

As a countermeasure to this problem, information for copy control is added to digital contents so that illegal copying may be prevented using the additional information.

For example, as a control for prevention of copying, a copyright protection measure according to a generation limiting copying control system called SCMS (Serial Copy Management System) wherein copying of audio contents is permitted once but further copying from the copy is inhibited is employed by a CD (Compact Disc), an MD (Mini Disc; trademark), a DAT (Digital Audio Tape) or a like medium.

A copying control system of the SCMS is described below with reference to FIG. 1.

For example, an audio signal of an original source is recorded digitally on a disc 1. The digital audio signal is recorded in a predetermined recording format on the disc 1; and additional information representing that copying is permitted only once according to the SCMS system is recorded, for example, in a particular area in the digital signal.

A reproduction apparatus 2 reads out a signal from the disc 1, reproduces the digital audio signal from the read signal and transmits the reproduced audio signal to a recording apparatus 3 together with the additional information. Thereupon, the reproduction apparatus 2 transmits the digital audio signal to the recording apparatus 3 in a time equal to the time required for reproduction of the digital audio signal at a normal reproduction rate (normal or standard rate).

The recording apparatus 3 receives the digital audio signal and, if the additional information to the digital audio signal indicates that copying is permitted once, recognizes that copying of the input digital signal is possible. Thus, after the recording apparatus 3 confirms that the additional information indicates that copying is permitted once, it records the digital signal as a copy onto a recordable disc 4. Thereupon, the recording apparatus 3 rewrites the additional information from "copying is permitted once" to "copying is inhibited". Accordingly, copying recording of the digital recording is performed onto the recordable disc 4, and the information of "copying is inhibited" is recorded as the additional information to the digital signal.

When the disc 4 (disc of the first generation) for which copying recording has been performed for the first time is reproduced by a reproduction apparatus 5 and the digital signal thus reproduced is supplied to a recording apparatus 6, the recording apparatus 6 recognizes that the additional information indicates that copying is inhibited, and therefore cannot record the digital signal onto a recordable disc 7.

The copying rate then is equal to the transmission rate of the audio signal from the reproduction apparatus 2 and is equal to a normal reproduction rate at which the audio signal is reproduced in a standard reproduction time.

As described above, the SCMS system achieves protection of the copyright by controlling so that, although copying of the first generation is permitted, copying of the second generation from a medium of the first generation is inhibited.

The copyright protection by the SCMS system, however, has a problem in that, although copying of the second generation is inhibited, copying of the first generation from one original source is permitted any number of times to produce copies. In the conventional copying control system described above, since the time required for copying is equal to the standard reproduction time, time is required for copying, and it has been considered that actual damage to copyright protection is not very significant.

However, according to digital recording onto a disc or a semiconductor memory in recent years, high rate copying can be performed readily when compared with conventional copying onto a tape by analog recording. Particularly where a signal compression technique is used for an audio signal or where an audio signal is transferred at a high bit rate, copying also at a multiple rate is possible.

Where such high rate copying as just described is allowed, copying of the first generation can be performed in a very short time, and this makes it possible to produce a large number of copies of the first generation in a short time from one original source. Consequently, there is a possibility that copyright protection may not be achieved effectively. Therefore, taking such a variation in technical environment regarding copying as described above into consideration, it is demanded to introduce a copyright protection system which limits copying more strictly than ever.

To an owner of copyright, it is advantageous to introduce a system which strictly limits copying in this manner. However, to a user, the system is not acceptable because copying which has been permitted till now is inhibited.

Therefore, if a new copyright protection system which strictly limits copying is adopted by a recording apparatus to be placed on the market newly, since copying by a conventional recording apparatus makes a loophole to illegal utilization, the recording apparatus which adopts the new copyright protection system may not possibly be accepted by the market.

SUMMARY OF THE INVENTION

It is an object of the present invention to provide a transfer apparatus which can achieve balancing in profit and loss between a proprietor of copyright and a user.

In order to attain the object described above, according to the present invention, there is provided a transfer apparatus for transferring data, including instruction means for providing an instruction of a transfer rate at which the data is to be transferred, transfer control means for variably using one of transfer control methods for the data in response to the transfer rate of the instruction provided by the instruction means, and billing control means for changing the transfer control method by the transfer control means in response to billing processing performed by a user of the transfer apparatus.

With the transfer apparatus, the transfer control method to be used for copyright protection is varied in response to the transfer rate of the data to be transferred. Consequently, copyright protection wherein balancing in profit and loss between a proprietor of copyright and a user is achieved can be realized.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 4 is a block diagram showing an example of a construction of a reproduction machine of a copy control system according to a second preferred embodiment of the present invention; and FIG. 5 is a block diagram showing an example of a construction of a recording machine ready for high rate copying used in the copying control system of the second embodiment of the present invention.

DESCRIPTION OF THE PREFERRED EMBODIMENTS

In the following, preferred embodiments of the present invention are described with reference to the accompanying drawings. In the embodiments described below, the present invention is applied to a copying control system for an information signal. More specifically, in the embodiments, the copying control system uses a digital audio signal as the information signal, and adopts a copyright protection system according to an SCMS system similar to the conventional SCMS system when copying is to be performed at a copying rate like or equal to a rate at which the information signal is reproduced in a time equal to a standard reproduction time of time series information similarly as in a conventional copying control system, that is, when normal rate copying is to be performed. On the other hand, when copying at a higher rate is to be performed, the copying control system permits copying conditionally if charging is approved by a user.

It is to be noted that, in the following description, copying at a normal rate is referred to as normal rate copying and copying at a higher rate is referred to as high rate copying.

First Embodiment

Figure 1:
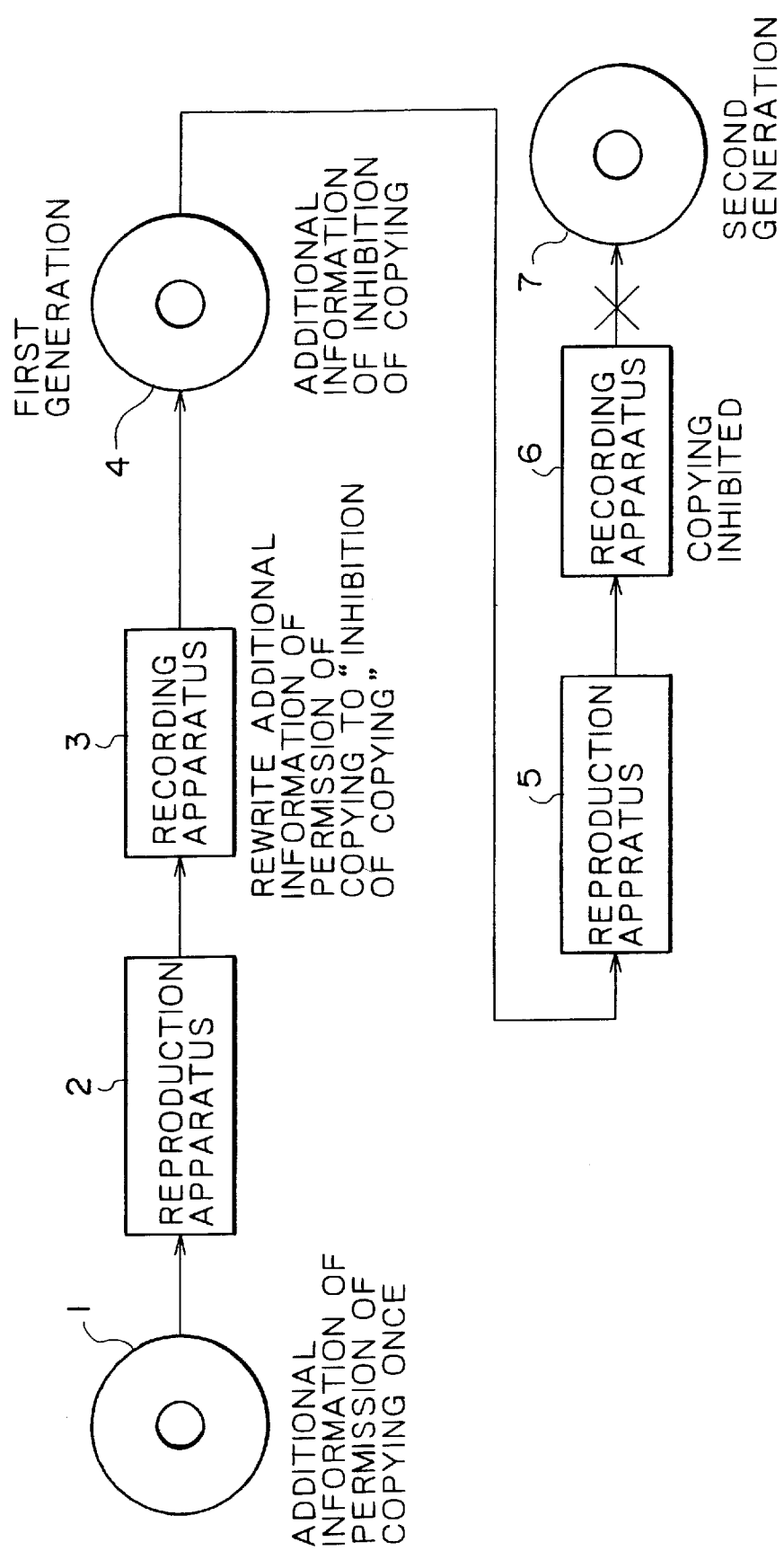
FIG. 1 is a diagrammatic view showing a conventional copying control system.
Figure 2:
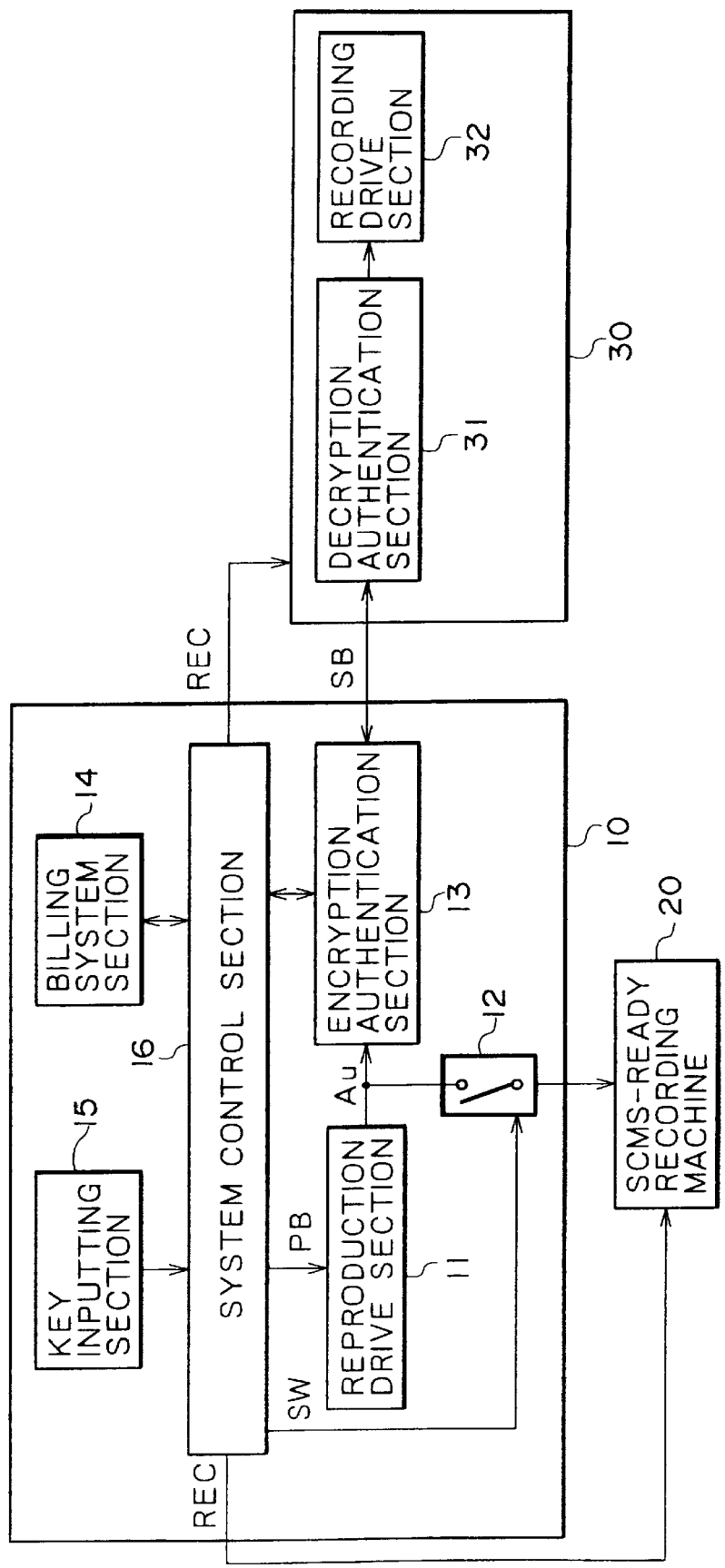
FIG. 2 is a block diagram showing a general construction of an entire copying control system according to a first preferred embodiment of the present invention.

Referring to FIG. 2, there is shown a general construction of a copying control system according to a first preferred embodiment of the present invention. The copying control system for an information signal according to the first embodiment uses, for example, a CD (compact disc) as a recording medium and includes a reproduction machine 10, an SCMS-ready recording machine 20 similar to a conventional SCMS-ready recording machine, and a recording machine 30 ready for high rate copying. In the present copying control system, a digital audio signal transmitted from the reproduction machine 10 to the recording machine 20 or the recording machine 30 is data which is not compression data.

The reproduction machine 10 includes a reproduction drive section 11, a switch circuit 12, an encryption authentication section 13, a billing system section 14, a key inputting section 15 and a system control section 16.

The reproduction drive section 11 drives a CD as a recording medium to rotate and reads out a digital signal recorded on the CD to reproduce a digital audio signal. The driving speed of the reproduction drive section 11 is variable in accordance with a drive control signal from the system control section 16. The recording machine 20 can vary the reproduction rate thereof by varying the drive speed in this manner. Accordingly, in the present copying control system, the data rate (data transmission rate) of a reproduction digital audio signal Au from the reproduction drive section 11 depends upon the drive speed.

In the present copying control system, the reproduction machine 10 can vary the reproduction drive speed between a normal speed at which an audio signal is reproduced in a standard reproduction time and multiple speeds at which an audio signal is reproduced while a CD is driven to rotate at a drive speed as high as twice or more. The multiple speeds may be such high drive speeds as, for example, twice, three times, four times, five times, . . . the normal speed.

The reproduction digital audio signal Au from the reproduction drive section 11 is supplied to the SCMS-ready recording machine 20 through the switch circuit 12. The switch circuit 12 is provided to control the reproduction digital audio signal Au from the reproduction drive section 11 so that it may be transmitted to the SCMS-ready recording machine 20 or not.

The switch circuit 12 is controlled for switching with a switching control signal SW from the system control section 16. Only when a copying instruction inputted to the system control section 16 from the key inputting section 15 indicates normal rate copying, the system control section 16 produces a switching control signal SW for controlling the switch circuit 12 to an on-state so that the reproduction digital audio signal Au may be supplied to the SCMS-ready recording machine 20. In other words, when the copying instruction from the user is high rate copying, the switch circuit 12 is controlled to be switched off so that the reproduction digital audio signal Au may not be supplied to the SCMS-ready recording machine 20.

The SCMS-ready recording machine 20 is a recording machine which performs copying control for copyright protection in accordance with the SCMS system described hereinabove and can perform copying of the first generation of a digital audio signal at the normal rate any number of times. In particular, when the additional information of the SCMS system is "copying is permitted once", the SCMS-ready recording machine 20 executes copying recording of a digital audio signal. It is to be noted that a recording medium for use with the recording machine 20 may be a magnetic tape, a magneto-optical disc such as an MD (Mini Disc: trademark), an optical disc, a magnetic disc, a semiconductor memory or a magnetic memory.

The reproduction digital audio signal Au from the reproduction drive section 11 is transmitted to the high rate copying-ready recording machine 30 through the encryption authentication section 13. The high rate copying-ready recording machine 30 includes a decryption authentication section 31 which is paired with the encryption authentication section 13, and a recording drive section 32. It is to be noted that any of such recording media as mentioned above may be used as a recording medium for use with the recording drive section 32.

The encryption authentication section 13 communicates predetermined data for authentication with the decryption authentication section 31 under the control of the system control section 16 to effect authentication processing of authenticating whether or not the recording machine 30 is a recording machine which is legally ready for the copyright protection system of the present embodiment. If the authentication is established, then the encryption authentication section 13 encrypts the digital audio signal Au and transmits the encrypted digital audio signal Au to the recording machine 30. The encryption authentication section 13 transmits also information of a cryptographic key to be used for decryption of the encrypted digital audio signal Au. However, if the authentication is not established, then the encryption authentication section 13 does not transmit the information of the cryptographic key to the recording machine 30 or does not transmit the encrypted digital audio signal Au to the recording machine 30. When the cryptographic key is not available, the recording machine 30 cannot decrypt the encrypted digital audio signal Au and consequently fails to perform normal copying recording.

Further, in the present copying control system, even if the reproduction machine 10 succeeds in authentication of the recording machine 30, it does not necessarily deliver information of a cryptographic key or transmit a digital audio signal to the recording machine 30 in all cases.

In particular, if the copying instruction from the user indicates normal rate copying, then only if authentication of the recording machine 30 is established, the system control section 16 controls so that a cryptographic key may be delivered to the recording machine 30. However, if the copying instruction indicates high rate copying of the digital audio signal Au, the system control section 16 controls so that, only when the billing system section 14 acquires approval of charging from the user, the cryptographic key may be delivered or the digital audio signal Au may be transmitted to the recording machine 30.

Here, the approval of charging from the user may be performed, for example, by payment of a charge for high rate copying with a prepaid card. In this instance, the billing system section 14 includes a card reader and so forth.

Alternatively, where the billing system section 14 is connected to a billing center over a communication line such as a telephone line, it may be controlled so that the card number of a credit card is sent to the billing center to obtain approval of charging from the user.

As an another alternative, where the user is registered as a member in a predetermined management center in advance, upon high rate copying by the recording machine 30 of the user, inquiries about the membership of the user may be made to the management center with the identification number of the recording machine 30 of the user or an ID of the user, and when affirmative, confirmation is obtained, it is determined that approval of charging of the user has been acquired. In this instance, the charge is paid later.

It is to be noted that, in the system shown in FIG. 2, the system control section 16 of the reproduction machine 10 controls the reproduction machine 10 and the recording machine 20 or the recording machine 30 so that, when copying is to be performed, they may be put into a reproduction condition and a recording condition, respectively, in synchronism with each other. To this end, as seen from FIG. 2, the system control section 16 supplies a reproduction command PB to the reproduction drive section 11 and supplies a recording command REC to the recording machine 20 or the recording machine 30 in synchronism with each other. Also synchronous recording, for example, from a CD to an MD or the like is included in the recording operation described above.

By such a protection measure as described above, copyright protection in accordance with a copying rate, that is, comparatively severe copyright protection when the copying rate is comparatively high, can be achieved. In particular, in the copying control system described above, if it is tried to perform normal rate copying, then copying by a copying control system similar to the conventional system can be performed. However, high rate copying is permitted only when a predetermined charge is paid.

Figure 3:
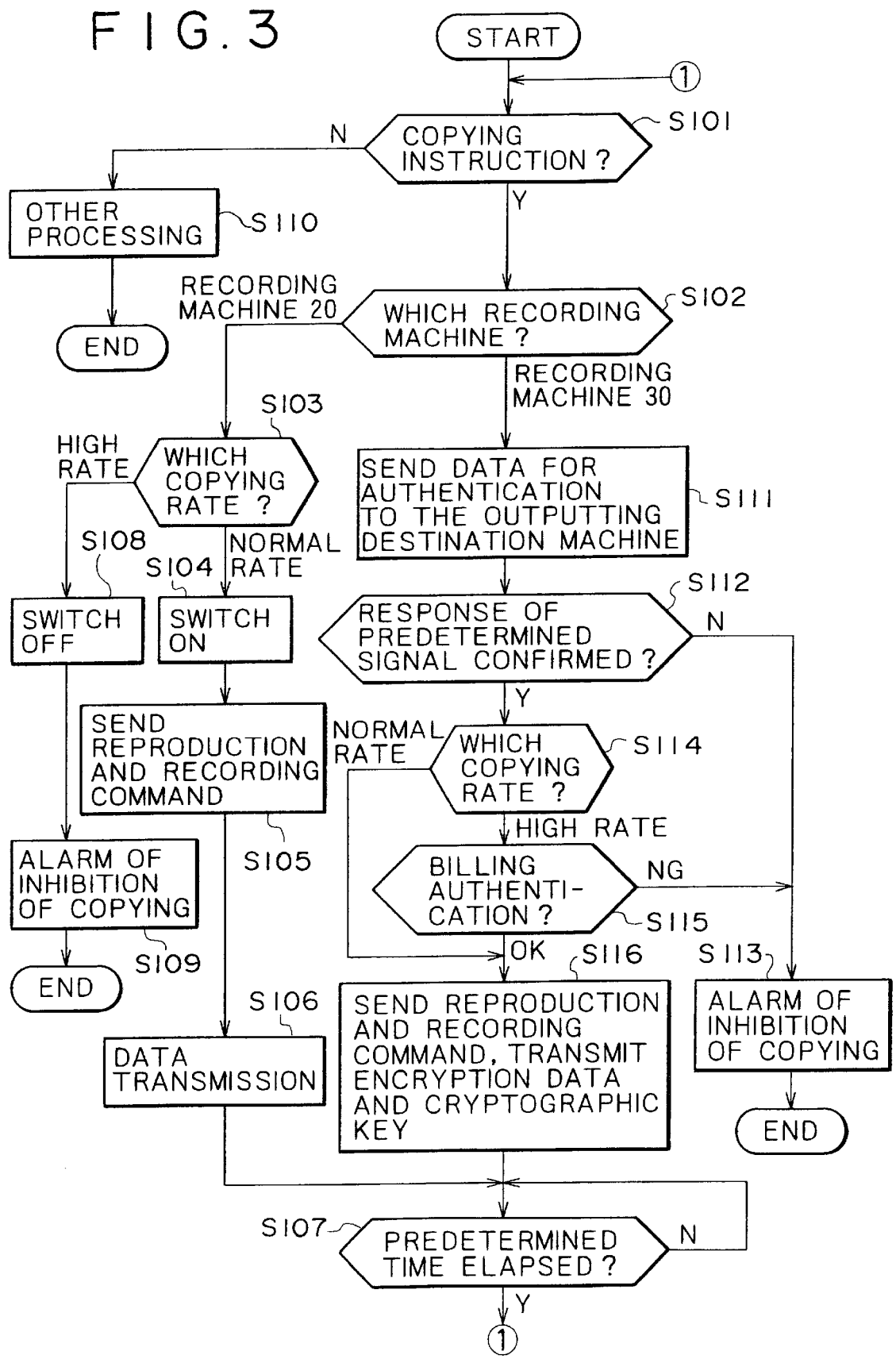
FIG. 3 is a flow chart illustrating a flow of processing operation of the copying control system of FIG. 2 upon copying.

Copying operation of the copying control system of FIG. 2 is described in more detail with reference to a flow chart of FIG. 3. The flow chart of FIG. 3 corresponds to processing operation of the system control section 16 of the reproduction machine 10.

First in step S101, it is discriminated whether or not a key input from the key inputting section 15 is a copying instruction. If the key input is not a copying instruction, then the control advances to step S110, in which processing corresponding to the key input is performed.

On the other hand, if the result of discrimination in step S101 is that the key input is a copying instruction, then the control advances to step S102, in which it is discriminated which one of the recording machine 20 and the recording machine 30 is to be used for copying. When the user performs the key inputting of a copying instruction, the user inputs from the key inputting section 15 which one of the recording machines is to be used for copying recording. Therefore, in step S102, it is discriminated from the key input which one of the recording machines is to be used for copying.

The reproduction machine 10 has a function of recognizing whether or not the recording machine 20 or the recording machine 30 is connected thereto, and when the recording machine 20 or the recording machine 30 is not connected to the reproduction machine 10, a copying instruction using the recording machine which is not connected to the reproduction machine 10 is ignored.

If the result of discrimination by the system control section 16 in step S102 indicates that the recording machine 20 is connected to the reproduction machine 10, then the control advances to step S103, in which the system control section 16 discriminates whether the copying of the instruction is normal rate copying (normal speed reproduction) or high rate copying (multiple speed reproduction). If it is discriminated that the copying of the instruction is high rate copying, then the control advances to step S108, in which the system control section 16 switches off the switch circuit 12, and then to step S109, in which the system control section 16 generates an alarm or makes a display representing that copying is impossible.

Similarly, when it is discriminated in step S103 by the system control section 16 that the copying of the instruction is normal rate copying, the control advances to step S104, in which the system control section 16 controls the switch circuit 12 to an on-state, and then to step S105, in which the system control section 16 sends a reproduction command PB to the reproduction drive section 11 and sends a recording command REC to the recording machine 20. Thereafter, the control advances to step S106, in which the system control section 16 transmits the digital audio signal Au to the recording machine 20.

Then, the control advances to step S107, in which the system control section 16 discriminates whether or not an interval of time for discrimination of an input determined in advance has elapsed, and if the interval of time has elapsed, then the control returns to step S101. Then, the system control section 16 discriminates in step S101 whether or not the state of the key input command remains the copying instruction. If the key input command remains the copying instruction, then the processing in the steps beginning with step S102 described above is repeated. On the other hand, if it is discriminated that another key is operated, for example, if a stop key is operated, then the control advances to step S110, in which stopping processing, the processing corresponding to the key is performed.

When the normal rate copying by the recording machine 20 described above is performed, since the drive speed of the reproduction drive section 11 is the normal reproduction speed, the transmission rate of the digital audio signal supplied to the recording machine 20 is equal to the normal reproduction speed. The SCMS-ready recording machine 20 receives the digital audio signal Au from the reproduction machine 10, detects the additional information for the SCMS included in the signal, and executes copying if the additional information is "copying is permitted once". However, if the additional information indicates "copying is inhibited", then the recording machine 20 stops copying recording.

Then, if it is discriminated in step S102 that the recording machine 30 ready for high rate copying is designated, then the control advances to step S111, in which data for authentication of whether or not the recording machine 30 is one which complies with the copying control system of the present embodiment is sent from the reproduction machine 10 to the recording machine 30 through the encryption authentication section 13.

In this instance, if the recording machine 30 is a compliant recording machine, then a predetermined signal is sent back to the reproduction machine 10 from the recording machine 30. Thus, in step S112, the system control section 16 discriminates whether or not the predetermined signal is sent back thereto from the recording machine 30. If the predetermined signal is not sent back from the recording machine 30, then the control advances to step S113, in which an alarm representing that copying recording is inhibited is generated and the system is put into a stop condition.

If it is discriminated in step S112 that the predetermined signal is sent back from the recording machine 30, then the control advances to step S114, in which the system control section 16 discriminates whether the copying of the instruction is normal rate copying or high rate copying. If it is discriminated in step S114 that the copying of the instruction is high rate copying, then the control advances to step S115, in which the system control section 16 discriminates whether or not approval of charging by the user has been obtained.

If it is discriminated in step S115 that such approval of charging has not been obtained, then the control advances to step S113, in which an alarm representing that copying recording is inhibited is generated and the system is put into a stop condition. On the other hand, if it is discriminated in step S115 that such approval of charging as described above has been obtained, then the control advances to step S116. In the meantime, when it is discriminated in step S114 that the copying instruction indicates normal rate copying, the control advances to step S116 bypassing the step S115.

Then in step S116, the system control section 16 sends a reproduction command PB to the reproduction drive section 11 and sends a recording command REC to the recording machine 30. Then, the system control section 16 encrypts the digital audio signal Au and transmits the encrypted digital audio signal Au to the recording machine 30. The system control section 16 further sends a cryptographic key for decryption to the recording machine 30.

Next to step S116, the control advances to step S107, in which the system control section 16 discriminates whether or not the interval of time for discrimination of a key input determined in advance has elapsed. If the interval of time has elapsed, then the control returns to step S101. Then in step S101, the system control section 16 discriminates whether or not the key input command remains the copying instruction. If the key input command remains the copying instruction, then the system control section 16 repeats the processing in the steps beginning with step S102 described above. On the other hand, if it is discriminated that another key is operated newly, for example, if the stop key is operated, then the control advances to step S110, in which stopping processing which is processing corresponding to the key is executed by the reproduction machine 10.

If authentication of the recording machine 30 is established and the copying instruction indicates high rate copying and then approval of charging has been obtained, since a cryptographic key is sent to the recording machine 30 as described above, the encrypted digital audio signal Au received from the reproduction machine 10 is decrypted by the decryption authentication section 31 of the recording machine 30. Then in the recording machine 30, the decrypted digital audio signal is supplied to the recording drive section 32, by which copying recording is performed. In this instance, the recording drive section 32 performs recording of the information signal at a rate corresponding to the transmission rate. Accordingly, when the transmission rate is high, high rate copying recording is performed.

Further, the recording drive section 32 records additional information representing that further copying is inhibited onto the recording medium onto which the information signal has been recorded. Consequently, also copying from the recording medium produced by high rate copying is inhibited.

In this manner, high rate copying is enabled if the user pays the charge for copying. Although the copyright protection is severer than that of the conventional copying control system of the SCMS system, where the advantage that high rate copying is possible is taken into consideration, the present copying control system has a utility value to the user. On the other hand, to the owner of the copyright, since a charge can be collected when a copy is produced at a high rate, even if a large number of copies of the first generation are produced, corresponding copyright protection can be achieved.

Second Embodiment

In the copying control system of the first embodiment described above, high rate copying is performed such that the drive speed of the recording medium by the reproduction drive section 11 is set to a high speed to make the data transfer rate of the digital audio signal Au high so that the digital audio signal Au is supplied to the recording machine 30 at the high transfer rate. However, where a signal of compressed data is used as a digital audio signal, even if the data transfer rate is equal to that for normal rate copying, transmission of audio data can be performed in a shorter time, and consequently, high rate copying by a recording machine is allowed.

The copying control system of the present second embodiment performs copying of data which remains in the form of compressed data to assure a high copying rate.

Also the copying control system of the present embodiment has a basic block construction similar to that of the copying control system of the first embodiment described hereinabove with reference to FIG. 2. However, although the copying control system of the present embodiment is similar to the copying control system of the first embodiment in that a digital audio signal of a base band is transmitted from the reproduction machine 10 to the SCMS-ready recording machine 20, it is different from the copying control system of the first embodiment in that data transmitted from the reproduction machine 10 to the recording machine 30 is compressed data.

The copying control system of the present embodiment is described in connection with operation of recording audio data reproduced, for example, from a copying object disc onto a non-recorded disc to effect copying. In this instance, audio data is recorded in the form of data compressed in accordance with the ATRAC (Adaptive Transform Acoustic Coding) method or the MPEG (Moving Picture Coding Experts Group) audio compression method which are well known in the art.

Reproduction Machine in the Second Embodiment

An example of a construction of the reproduction machine in the copying control system of the present embodiment is described below with reference to FIG. 4.

FIG. 4 is a block diagram showing an entire construction of the reproduction machine. Referring to FIG. 4, the reproduction machine is generally denoted at 100. Compressed audio data recorded on a copying object disc 101 loaded in the reproduction machine 100 is read out by a reading-out section 102 and supplied to a data decompression decoding section 103, by which it is decompressed and decoded into a digital audio signal Au.

The digital audio signal Au from the data decompression decoding section 103 is led out to an output terminal 106 past a switch circuit 104 through an IEC 958 (International Electrotechnical Commission 958) interface 105 which is a conventionally used interface for a digital signal.

The SCMS-ready recording machine 20 described hereinabove is connected to the output terminal 106. Accordingly, the digital audio signal Au is supplied to the SCMS-ready recording machine 20 similarly as in the copying control system of the first embodiment, and normal rate copying control by an SCMS system similar to the conventional SCMS system is performed by the SCMS-ready recording machine 20 similarly as in the copying control system of the first embodiment.

In the reproduction machine 100 in the copying control system of the present second embodiment, digital audio data in a compressed condition from the reading-out section 102 is led out to an output terminal 109 through an encryption section 107 and an IEEE (The Institute of Electrical and Electronics Engineers, Inc.) 1394 interface 108. A high rate copying-ready recording machine 300 is connected to the output terminal 109. In this instance, prevention of illegal copying of the compressed digital output is achieved by the IEEE 1394 secure bus.

In particular, data from the reading-out section 102 is supplied to an SCMS decoding section 111, by which additional data for copying control of the SCMS system included in the compressed data is decoded. Then, an output of the decoded data is supplied to a control section 110. The decoded output of the additional data indicates whether copying of data of the copying object disc 101 is permitted once or inhibited, and the control section 110 discriminates what condition the decoded output indicates.

The data from the reading-out section 102 is first supplied to the encryption section 107, by which encryption based on a cryptographic key, which is different for each communication, is performed for the compressed audio data under the control of the control section 110. The encrypted data from the encryption section 107 is supplied to the high rate copying-ready recording machine 300, which is an electronic apparatus of the outputting destination, through the IEEE 1394 interface 108 past the output terminal 109. The IEEE 1394 interface 108 converts the data supplied thereto from the encryption section 107 so that it may conform with the IEEE 1394 interface standards and outputs resulting compressed audio data.

Thereupon, the control section 110 communicates with the apparatus of the outputting destination through the IEEE 1394 interface 108 to discriminate whether or not the apparatus of the outputting destination is an apparatus which complies with the IEEE 1394 secure bus standards (such apparatus is hereinafter referred to as compliant apparatus) and, if the apparatus of the outputting destination is a compliant apparatus, whether or not the apparatus is a recording apparatus.

Then, in the reproduction machine 100 of the copying control system of the present embodiment, the control section 110 determines, from a discrimination output of the copying control information from the SCMS decoding section 111 and discrimination information of the apparatus of the outputting destination received through the IEEE 1394 interface 108, whether or not cryptographic key information for decryption processing which is performed by the encryption section 107 should be sent out to the outputting destination.

For example, if the apparatus of the outputting destination is not a compliant apparatus, then the cryptographic key information is not delivered to the apparatus of the outputting destination. On the other hand, even if the apparatus of the outputting destination is a compliant apparatus, if it is a recording apparatus, then cryptographic key information is not delivered to the apparatus of the outputting destination if the copying control information from the SCMS decoding section 111 indicates "copying is inhibited".

Further, in the copying control system of the present embodiment, also when information of approval of charging from the user is not acquired from a billing authentication section 116 by the control section 110, cryptographic key information is not delivered to the apparatus of the outputting destination.

In the copying control system of the present embodiment, the billing authentication section 116 is connected to a card reader 115, and if the user loads a prepaid card 114 into the card reader 115, then the billing authentication section 116 controls so that a charge for high rate copying is paid from the balance of the prepaid card. When the payment of the charge for high speed copying is performed, the billing authentication section 116 determines that approval of charging of the user has been acquired, and controls so that information of approval of charging representing this is sent to the control section 110.

A key inputting section 113 is means for allowing the user to input an instruction for normal rate copying or high rate copying. The high rate copying in the copying control system of the present embodiment signifies copying of compressed data through the IEEE 1394 as it is. Meanwhile, the normal rate copying signifies copying of audio data of a base band through the IEC 958.

It is to be noted that, in the present copying control system, the designation of one of normal rate copying and high rate copying by the user from the key inputting section 113 may be only designation of an output terminal or designation of a recording machine of the outputting destination. Or, the designation may be designation of base band transmission or compressed data transmission.

In the present copying control system, incidental information can be transmitted upon transmission of compressed data by the IEEE 1394 interface. Therefore, in the present copying control system, for example, information of the names (titles) of music data recorded on the UTOC (User Table of Contents) of an MD is read out by the reading-out section 102, and the control section 110 delivers the information to an incidental information production section 112. Then, the control section 110 controls so that the information of the names (titles) of the music data are sent to the IEEE 1394 interface 108 through the encryption section 107 so that the information may be included in packets of the corresponding compressed audio data.

Consequently, when copying is performed, also the names (titles) of the music data can be recorded onto the copied MD disc together with the compressed audio data.

It is to be noted that the copying control system of the present embodiment can also output analog output data. However, since the analog audio signal output in this instance does not include copying control information of the SCMS system, copying of the audio signal in the form of an analog signal can be performed freely. Taking this into consideration, the control section 110 in the copying control system of the present embodiment controls so that a copying control signal having the same significance contents as those of the copying control information detected by the SCMS decoding section 111 is superposed as electronic watermark information WM on the audio signal of the base band.

In particular, the audio signal of the base band from the data decompression decoding section 103 is supplied to an electronic watermark information WM addition section 121. Further, a copying control signal having the same significance contents as those of the copying control information detected by the SCMS decoding section 111 is supplied from the control section 110 to the electronic watermark information WM addition section 121. The electronic watermark information WM addition section 121 superposes the copying control signal on the audio data in such a manner that no influence may be hand on the audio data. For the processing of adding the electronic watermark information WM, for example, a method of spreading the copying control signal by spectrum spreading to embed the copying control signal into the base band can be used.

The digital audio data of the base band from the electronic watermark information WM addition section 121 is supplied to a D/A converter 122, by which it is converted into an analog audio signal, and the analog audio signal is outputted to an external electronic apparatus through an output terminal 123.

Operation of the reproduction machine 100 described above upon copying is described now.

First, if the user selects normal rate copying, then the switch circuit 104 is switched on by the control section 110, and an audio signal Au of the base band is supplied through the IEC 958 interface 105 past the output terminal 106 to the SCMS-ready recording machine 20, by which copying control similar to the conventional copying control by the SCMS system is performed.

On the other hand, if the user selects high rate copying, then the switch circuit 104 is switched on by the control section 110. Then, the control section 110 sends a signal for predetermined authentication to the recording machine 300, which is the outputting destination, through the IEEE 1394 interface 108. If the outputting destination machine is a compliant recording machine, then a predetermined response signal for authentication is sent back from the outputting destination machine through the IEEE 1394 interface 108, and consequently, the control section 110 confirms the response signal.

Then, the control section 110 controls the encryption section 107 to encrypt the compressed audio data and supplies the encrypted compressed audio data to the outputting destination machine through the IEEE 1394 interface 108. However, if the outputting destination machine is not a compliant apparatus, then the control section 110 does not deliver a cryptographic key for decryption to the outputting destination machine. On the other hand, if the outputting destination machine is a compliant apparatus, then the control section 110 discriminates whether or not the outputting destination machine is a recording machine. Then, if the outputting destination machine is a recording machine, then the control section 110 refers to the copying control information from the SCMS decoding section 111, and if the copying control information indicates "copying is inhibited", then the control section 110 controls so that the cryptographic key may not be delivered to the outputting destination machine.

Then, if the outputting destination machine is a compliant recording machine and the copying control information indicates "copying is permitted" or "copying is permitted once", then the control section 110 refers to charging approval information from the billing authentication section 116, and if approval of charging by the user has been obtained, then the control section 110 controls so that the cryptographic key may be delivered to the outputting destination machine.

As a result, the high rate copying-ready recording machine 300 which is a compliant recording machine is permitted to perform copying of the compressed audio data, that is, high rate copying. It is to be noted that, since the compressed audio data includes a copying control signal of the SCMS system, also copying control by the SCMS system is performed by the high rate copying-ready recording machine 300.

Compliant Recording Apparatus

Subsequently, a recording machine which is a compliant apparatus is described. FIG. 5 is a block diagram showing an example of a construction of the compliant recording machine.

Referring to FIG. 5, the compliant recording machine is generally denoted at 300 and has a digital input terminal 301 for the IEEE 1394 interface and an analog input terminal 306. The digital input terminal 301 is connected to an IEEE 1394 interface 302. The IEEE 1394 interface 302 performs processing for converting data, which has been converted so as to comply with the IEEE 1394 bus interface standards, back into data of an original form.

Data from the IEEE 1394 interface 302 is supplied to a decryption section 303. As described hereinabove, when the apparatus connected to the digital input terminal 301 discriminates that copying of an information signal is permitted, cryptographic key information for decryption of the information signal is sent from the machine. When such cryptographic key information is acquired, the decryption section 303 can decrypt the encrypted data from the IEEE 1394 interface 302 to restore the compressed audio data. The restored compressed audio data is supplied to a selector 304.

Meanwhile, video information inputted through the analog input terminal 306 is supplied through an analog interface 307 to a compression encoding section 308, by which it is compressed, and the compressed video information is supplied to the selector 304.

The selector 304 selectively outputs one of the data from the decryption section 303 and the data from the compression encoding section 308 in accordance with a selector control signal corresponding to an input selection by the user. The output data of the selector 304 is supplied to a recording control section 312 through an SCMS rewriting section 311.

When compressed digital data is inputted from the digital input terminal 301 and the copying control information of the SCMS system indicates "copying is inhibited", a cryptographic key is not sent to the high rate copying-ready recording machine 300 from the reproduction machine connected to the digital input terminal 301, the encrypted compressed digital data cannot be decrypted and copying is inhibited by the recording control section 312.

If the encrypted digital data is successfully decrypted by the decryption section 303, then since the copying control information indicates "copying is permitted" or "copying is permitted once", the recording control section 312 controls a writing section 313 to execute recording. Consequently, copying recording of the compressed audio data onto a non-recorded disc 314 is executed by the writing section 313.

Upon such copying recording, the copying control information of the SCMS system is rewritten by the SCMS rewriting section 311 if necessary. In particular, the data from the decryption section 303 is supplied to an SCMS decoding section 305, by which the copying control information is extracted from the received data. The extracted copying control information is supplied to a control section 310. If the copying control information of the SCMS system indicates "copying is permitted (copy free)", then the control section 310 determines that rewriting of the copying control information is unnecessary, but if the copying control information indicates "copying is permitted once", then the control section 310 controls the SCMS rewriting section 311 to rewrite the copying control information to "copying is inhibited".

Subsequently, copying of an analog audio signal inputted through the analog input terminal 306 is described.

The analog audio signal has copying control information superposed thereon as electronic watermark information WM by the reproduction machine 100 as described hereinabove. The electronic watermark informationl WM is detected by an electronic watermark information decoding section 309 and supplied to the control section 310.

The control section 310 discriminates based on the discrimination output of the electronic watermark information WM whether or not recording (copying) of the input information is permitted. Further, if it is discriminated that recording (copying) is permitted, then the control section 310 discriminates whether or not rewriting of the copying control information is necessary.

In particular, if the control section 310 discriminates based on the electronic watermark information WM that recording is inhibited, then it controls the recording control section 312 and the writing section 313 so that recording onto the disc 314 may not be executed.

On the other hand., if the control section 310 discriminates based on the electronic watermark information WM that copying is permitted (Copy Free), then it controls the recording control section 312 and the writing section 313 so that recording may be executed. In this instance, while the compressed digital data outputted from the recording control section 312 passes through the SCMS rewriting section 311, rewriting of the SCMS information therein is not performed by the SCMS rewriting section 311.

However, if the control section 310 discriminates based on the electronic watermark information WM that copying is permitted once (Copy Once), then it controls the recording control section 312 and the writing section 313 so that recording may be executed and further controls the SCMS rewriting section 311 so that the SCMS information may be rewritten to "copying is inhibited".

Other Forms

As a severe copying control system for copyright protection to be adopted for high rate copying, naturally it is possible to use a system which does not involve charging. For example, a uni-copy system may be employed. The uni-copy system controls so that the same contents can be copied only once by one recording machine. In particular, in the uni-copy system, when copying is performed by a recording machine, the contents ID is stored into a memory of the recording machine and, when an instruction to copy the same contents is inputted to the recording machine later, copying of the same contents is inhibited.

Also it is possible to adopt another system wherein, if a charge is paid, then copying by high rate copying is permitted any number of times, but if no charge is paid, then copying of the same contents is permitted only once in accordance with the uni-copy system described above.

Meanwhile, as the billing system, not only a system which employs a prepaid card but also a billing authentication system which employs a telephone line or the like as described above may be used. In the latter case, it is also possible to perform billing for each content if information of contents which make an object of charging is additionally sent to a billing center.

Further, while the copying control systems of the embodiments described above are described in connection with an audio signal, the information signal of an object of copying may alternatively be a video signal, a control signal or a text signal. Further alternatively, the information signal of an object of copying may be such an information signal which is not such a time series signal as an audio signal or a video signal as, for example, computer data.

In addition, the information outputting apparatus is not limited to such a reproduction machine as described above and may include any apparatus which, for example, temporarily stores information of an object of copying into a memory and then reads out the information from the memory and outputs it to a recording machine.

Further, in the copying control systems of the embodiments described above, copying of data read out from a medium by a reproduction drive of a reproduction machine onto another medium is described. However, the present invention can be applied also to recording control where digital data as is distributed, for example, over an FM network is received and transferred to a recording machine.

Furthermore, in the copying control systems of the embodiments described above, billing processing is performed by a reproduction machine side. However, billing processing may be performed alternatively by a recording machine side so that, also with regard to data whose copying is inhibited, recording of it onto a medium or production of a key for decryption may be permitted in accordance with the billing processing. Further, a controller of the recording machine may control the reproduction machine side so that transfer of data whose transfer is inhibited may be permitted.

While preferred embodiments of the present invention have been described using specific terms, such description is for illustrative purposes only, and it is to be understood that changes and variations may be made without departing from the spirit or scope of the following claims.

What is claimed is:

1. A transfer apparatus for transferring data, the apparatus comprising:
    instruction means for providing an instruction of a transfer rate at which data is transferred;
    transfer control means for selectively using one of a plurality of transfer control methods for the data in response to the transfer rate of the instruction provided by said instruction means; and
    billing control means for changing the transfer control method selected by said transfer control means in response to billing processing performed by a user of said transfer apparatus, wherein
    the transfer control means uses a transfer control method of the plurality of transfer control methods having a higher degree of strength of copyright protection for the data to be transferred as the transfer rate increases.

2. The transfer apparatus according to claim 1, wherein the plurality of transfer control methods include a method wherein the transfer of the data is inhibited.

3. The transfer apparatus according to claim 1, further comprising encryption means for encrypting the data, and wherein the plurality of transfer control methods include a method whereby encrypted data encrypted by said encryption means is transferred and transfer of a key for decryption of the encrypted data is controlled.

4. The transfer apparatus according to claim 1, further comprising addition means for adding to the data recording control information for controlling recording of the data onto a recording medium, and wherein the plurality of transfer control methods include a method wherein the recording control information added to the data by said addition means is controlled.

5. The transfer apparatus according to claim 2, wherein said billing control means cancels the inhibition of the transfer of the data by the transfer control method in response to the billing processing performed by the user.

6. The transfer apparatus according to claim 3, wherein said billing control means cancels the inhibition of the transfer of the key by the transfer control method in response to the billing processing performed by the user.

7. The transfer apparatus according to claim 4, wherein said billing control means changes the recording control information added to the data by the transfer control method to information for permission of recording of the data onto a medium in response to the billing processing performed by the user.

8. The transfer apparatus according to claim 1, wherein said billing control means changes the transfer control method in response to charge information of an object of the user onto which charge information is to be recorded.

9. The transfer apparatus according to claim 1, wherein said billing control means changes the transfer control method in response to billing processing provided by a billing system communicating with said transfer apparatus over a network, said billing system performing billing processing for a predetermined user.

10. The transfer apparatus according to claim 1, wherein, when said instruction means provides an instruction indicating a transfer rate equal to a predetermined reproduction rate of the data, said transfer control means uses one of the plurality of transfer control methods which limits recording of the data onto a recording medium only to the first generation.

11. The transfer apparatus according to claim 1, further comprising means for reading out the data from a recording medium on which the data is recorded, and wherein the transfer rate at which the data is transferred is determined in accordance with a reading out rate of said reading out means.

12. The transfer apparatus according to claim 1, further comprising means for reading out compressed data from a recording medium on which the data is recorded in a compressed condition, wherein if a reading out rate of said reading out means is a predetermined rate the transfer rate at which the data is transferred is substantially higher than the predetermined rate.

13. The transfer apparatus according to claim 4, wherein said addition means includes means for adding the recording control information as an electronic watermark to the data.

14. The transfer apparatus according to claim 4, wherein said transfer control means includes means for transferring the data as analog data.

15. A transfer apparatus for transferring data through an interface, the apparatus comprising:
    instruction means for providing an instruction of an interface to be used;
    transfer control means for selectively using one of a plurality of transfer control methods for the data in response to the interface of the instruction provided by said instruction means; and
    billing control means for changing the transfer control method selected by said transfer control means in response to billing processing performed by a user of said transfer apparatus, wherein
    the transfer control means uses a transfer control method of the plurality of transfer control methods having a higher degree of strength of copyright protection for the data to be transferred as a transfer rate increases.

16. A transfer method for transferring data, comprising the steps of:
    providing an instruction of a transfer rate at which data is to be transferred;
    selectively using one of a plurality of transfer control methods for the data in response to the transfer rate of the instruction; and
    changing the transfer control method in response to billing processing performed by a user, wherein
    a transfer control method of the plurality of transfer control methods having a higher degree of strength of copyright protection is selected for the data to be transferred as the transfer rate increases.

17. A transfer method for transferring data through an interface, comprising the steps of:
    providing an instruction of an interface used for transferring;
    using one of a plurality of transfer control methods for transferring the data in response to the interface of the instruction; and
    changing the transfer control method in response to billing processing performed by a user, wherein a transfer control method of the plurality of transfer control methods having a higher degree of strength of copyright protection is used for the data to be transferred as a transfer rate increases.

* * * * *